United States Patent
Kamkar et al.

(10) Patent No.: US 10,993,113 B2
(45) Date of Patent: *Apr. 27, 2021

(54) DEVICE FOR TRIGGERING CONTINUOUS APPLICATION EXECUTION USING BEACONS

(71) Applicant: OpenPath Security Inc., Marina Del Rey, CA (US)

(72) Inventors: Samy Kamkar, Los Angeles, CA (US); Cameron Kaye, Van Nuys, CA (US); Jacqueline Mak, Los Angeles, CA (US)

(73) Assignee: OpenPath Security Inc., Marina Del Rey, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 16/217,340

(22) Filed: Dec. 12, 2018

(65) Prior Publication Data

US 2020/0059788 A1 Feb. 20, 2020

Related U.S. Application Data

(63) Continuation of application No. 16/105,683, filed on Aug. 20, 2018, now Pat. No. 10,257,708.

(51) Int. Cl.
*H04W 12/08* (2021.01)
*H04L 29/06* (2006.01)
*H04W 48/12* (2009.01)
*H04W 56/00* (2009.01)
*G06F 9/445* (2018.01)
(Continued)

(52) U.S. Cl.
CPC ............ *H04W 12/08* (2013.01); *G06F 9/445* (2013.01); *G07C 9/00* (2013.01); *G07C 9/00309* (2013.01);
(Continued)

(58) Field of Classification Search
CPC ....... H04W 12/08; H04W 12/63; H04W 4/80; H04W 4/00; H04W 48/12; H04W 56/0015; H04L 63/0492; G06F 9/445
(Continued)

(56) References Cited

U.S. PATENT DOCUMENTS 8,897,741 B2 11/2014 Johnson
9,280,559 B1 * 3/2016 Jones ................... H04L 12/2816
(Continued)

OTHER PUBLICATIONS

Menon, Sruthi, et al. "Smart workplace—Using iBeacon." 2017 International Conference on Networks & Advances in Computational Technologies (NetACT). IEEE, 2017. (Year: 2017).*
(Continued)

*Primary Examiner* — Syed A Zaidi
(74) *Attorney, Agent, or Firm* — Ansari Katiraei LLP; Arman Katiraei; Sadiq Ansari

(57) ABSTRACT

One or more beaconing devices transmit synchronized changing beacons. The changing beacons trigger execution of an application that is installed but closed or not running on a mobile device, that is in wireless beaconing range of a beaconing device, and that has registered the changing beacons with the mobile device operating system ("OS") to trigger execution of the application upon receipt of the changing beacons. The changing beacons also keep the executing application running by resetting OS policies for closing the application when it is running with the mobile device in a locked or standby state. The application may perform different procedures and different times with the beaconing device or other devices including authorizing access to a secured resource when the mobile device is far away from the beaconing device, and confirming intent to access the secured resource when the mobile device is close to the beaconing device.

20 Claims, 10 Drawing Sheets

(51) Int. Cl.
*G07C 9/00* (2020.01)
*H04W 4/00* (2018.01)
*H04W 12/63* (2021.01)
*H04W 4/80* (2018.01)
*H04W 4/02* (2018.01)
*H04W 4/70* (2018.01)

(52) U.S. Cl.
CPC ...... *G07C 9/00571* (2013.01); *H04L 63/0492* (2013.01); *H04W 4/00* (2013.01); *H04W 12/63* (2021.01); *H04W 48/12* (2013.01); *H04W 56/0015* (2013.01); *G07C 2009/0096* (2013.01); *G07C 2209/63* (2013.01); *H04W 4/027* (2013.01); *H04W 4/70* (2018.02); *H04W 4/80* (2018.02)

(58) Field of Classification Search
USPC .......................................................... 726/4
See application file for complete search history.

(56) References Cited

U.S. PATENT DOCUMENTS

| | | | |
|---|---|---|---|
| 9,370,019 B2 | 6/2016 | Makh et al. | |
| 9,565,531 B2* | 2/2017 | Jack | H04W 4/18 |
| 9,589,402 B2* | 3/2017 | Raina | G07C 9/00309 |
| 9,596,600 B2* | 3/2017 | Hernandez | G06Q 20/3224 |
| 9,629,064 B2* | 4/2017 | Graves | H04L 67/2814 |
| 9,769,309 B1 | 9/2017 | Durham | |
| 9,961,523 B1 | 5/2018 | Daoura et al. | |
| 2014/0222577 A1* | 8/2014 | Abhyanker | G06Q 10/10 705/14.58 |
| 2015/0079942 A1 | 3/2015 | Kostka et al. | |
| 2015/0095402 A1* | 4/2015 | Fraccaroli | H04L 67/306 709/202 |
| 2015/0140982 A1* | 5/2015 | Postrel | H04W 4/80 455/418 |
| 2015/0204844 A1* | 7/2015 | Nothacker | G06K 9/00335 73/23.3 |
| 2015/0319144 A1 | 11/2015 | Barton et al. | |
| 2016/0142856 A1* | 5/2016 | Worrall | H04W 4/021 455/456.3 |
| 2016/0315723 A1 | 10/2016 | Koriyama et al. | |
| 2018/0206177 A1 | 7/2018 | Daoura et al. | |

OTHER PUBLICATIONS

NPL Search Terms (Year: 2021).*

* cited by examiner

| UUID 210 | Major Code 220 | Minor Code 230 |

DEVICE FOR TRIGGERING CONTINUOUS APPLICATION EXECUTION USING BEACONS

CLAIM OF BENEFIT TO RELATED APPLICATIONS

This application is a continuation of the U.S. non-provisional application Ser. No. 16/105,683, entitled "Device For Triggering Continuous Application Execution Using Beacons", filed Aug. 20, 2018.

BACKGROUND ART

Mobile devices, such as smartphones and other portable battery powered devices, have an operating system ("OS") to manage power usage by various applications installed on the mobile devices. The OS may prevent an application from running indefinitely in the foreground or background of the mobile device, and may close applications that are idle, that violate usage policies when the mobile device is locked or in a standby state, and/or that the OS determines to close for other reasons. For instance, the OS may give priority to certain applications and close other applications to ensure that the prioritized applications have sufficient resources to execute.

The OS may allow an application to wake up or execute from a closed or standby state in response to one or more triggers. A beacon is one such trigger that may be used to wake or trigger execution of a particular application (e.g., in a closed, standby, idle, background, or other inactive state) on a mobile device.

A beacon transmitter may be placed where execution of a particular application is desired. The transmitter may periodically transmit a beacon with a unique identifier. The beacon can be a numerical value or string of characters. Mobile devices that enter in transmission range of the beacon transmitter may receive the beacon via one or more wireless radios. The beacon passes to the mobile device OS, and the OS may trigger execution of a closed application that previously registered that beacon with the OS. For instance, a particular application may register one or more beacons that can be used to trigger execution of that particular application with the mobile device OS. The particular application may register the one or more beacons when the particular application is installed or first run on the mobile device.

The mobile device OS may restrict the use of beacons and/or other triggers in several ways. One restriction may permit a specific beacon or other trigger to trigger execution of an application once per defined interval (e.g., once every five minutes). If the application is closed (e.g., by the OS or user) after being triggered by the specific beacon, the OS may prevent the application from restarting or running for the remainder of the interval despite the mobile device receiving different instances of the same specific beacon. Another restriction may prevent a specific beacon from triggering execution of an application more than once while the mobile device remains in range of the transmitter, and the mobile device continues to receive the specific beacon. In other words, the mobile device may have to exit out of the transmitter range, stop receiving the specific beacon for some period of time (e.g., one minute), and reenter in range of the transmitter to receive the specific beacon before the OS will trigger subsequent execution of the application based on the specific beacon.

DETAILED DESCRIPTION

Figures 1, 2:
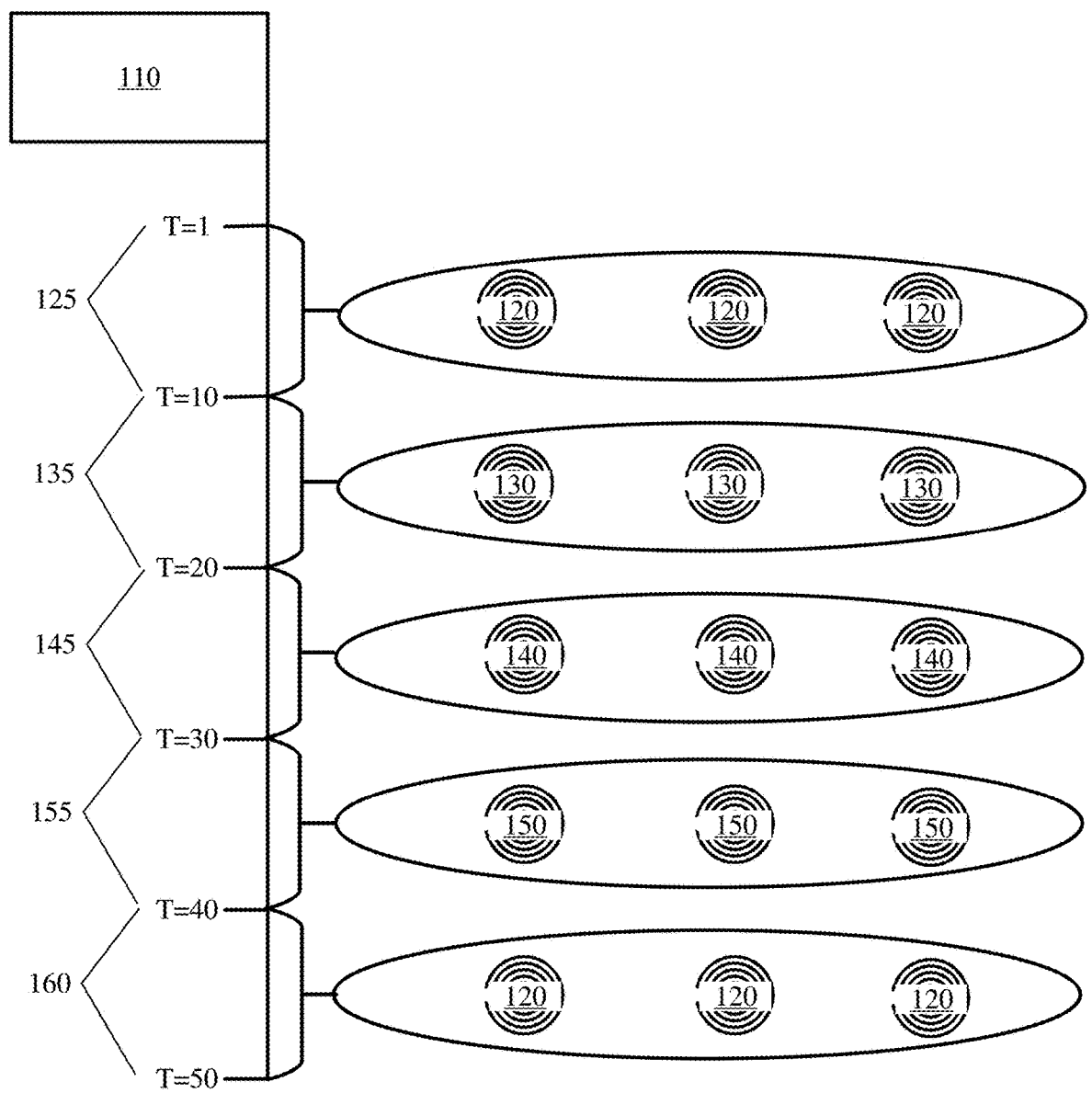
FIG. 1 illustrates transmission of a changing beacon from a beaconing device in accordance with some embodiments described herein.
FIG. 2 illustrates a format for beacons transmitted from a beaconing device in accordance with some embodiments described herein.

Mobile devices have various use cases that rely on beacons to trigger execution of different applications, and that require the applications to run for extended periods of time while remaining in range of the same beacon transmitter. Entry access is an example of such a use case for a mobile device.

With respect to entry access, the user experience hinges on the amount of time and the amount of user interactions that are needed to authorize and request access to a secured resource via a mobile device. The mobile device may replace physical keys and/or access cards (e.g., proximity cards operating at 125 kilohertz, or smartcards operating at 13.56 megahertz) so that a user has one less object to carry in order to authorize and request access to the secured resource. However, the user experience may be compromised when numerous user interactions with the mobile device are needed to obtain access. The user interactions with the mobile device may include the user retrieving the mobile device from a purse or pocket, unlocking the mobile device via a password, biometrics, gestures, or other means, finding and manually triggering execution of an entry access application, and then using the entry access application to authorize access and/or confirm intent to access. Moreover, the total time involved to perform these actions could cause the user to wait upon arriving at the secured resource before the authorization and confirmation of intent procedures are complete, and access to the secured resource is provided.

Beacons may be used to reduce the number of user interactions, and also the time spent waiting for authorization and intent confirmation to complete. Specifically, beacons may be used to automatically trigger execution of the entry access application when a mobile device installed with the entry access application enters in range of the beacon transmitter. The application, upon being triggered by a beacon transmitted from the beacon transmitter, may automatically perform the authorization procedure, and may confirm the user's intent to access the secured resource. In this case, access to the secured resource may be granted with no user interactions with the mobile device, and with access being granted prior to the user's arrival at the secured resource.

There are however several security implications associated with having the entry access application automatically authorize and confirm the user's intent to access a secured resource when the mobile device installed with the application enters in range and receives a first beacon. First, the user associated with the mobile device may have no intent to access the secured resource, and may simply be walking with the mobile device in range of the beacon transmitter. In this case, access would be provided to the secured resource without the user's knowledge or consent, and the secured resource may be accessed by other unauthorized users. Second, the user associated with the mobile device may be in range of the beacon but too far from the secured resource such that the authorization may be performed, access may be granted, and other unauthorized users closer to the secured resource may access the secured resource before the authorized user.

Delaying execution of either the authorization and/or intent confirmation procedures to occur after the mobile device has entered in range and received a beacon could subject the entry access application to one or more operating system ("OS") restrictions. For instance, the OS may close the entry access application before the user arrives at the secured resource, thereby preventing the application from confirming the user's intent to access the secured resource and/or completing other operations or procedures needed to obtain access to the secured resource. The OS may also prevent subsequently received beacons from reopening or waking the application until some interval expires or the mobile device exits out of the beacon range for some time before reentering in the beacon range.

The embodiments, as described herein, provide a system of one or more beaconing devices (e.g., transmitters) that transmit synchronized changing beacons. For instance, the one or more beaconing devices of the system may simultaneously transmit a first beacon during a first time, and may switch to and simultaneously transmit a different second beacon during a second time.

Each beaconing device, via the synchronized changing beacons, may trigger execution of an application that is installed on a mobile device when the mobile device comes in wireless beaconing range of the beaconing device and receives a first changing beacon, and the synchronized changing beacons are registered or otherwise configured with the mobile device OS to trigger execution of the application. The synchronized changing beacons may trigger execution of the application even when the mobile device is in a closed or standby state.

Each beaconing device, via the synchronized changing beacons, may also keep an executing application running indefinitely by circumventing beacon-based restrictions of the OS, and/or OS policies for closing applications that run when the mobile device is in a locked or standby state. Normally, when the mobile device and/or OS of the mobile device stop receiving a first beacon, and start receiving a different second beacon, it is because the mobile device has moved out of range of a first transmitter transmitting the first beacon, and into range of a different second transmitter transmitting the second beacon. In such cases, the mobile device OS may retrigger execution of the beacon-triggered application if closed, and/or may reset a timer for how long the application is permitted to run in the foreground, background, and/or while the mobile device is in a locked or standby state. This same scenario may be replicated by a particular beaconing device of the one or more beaconing devices of some embodiments without the user having to physically move the mobile device between different beaconing devices. In other words, the beaconing devices of some embodiments trick the OS into detecting a change in beacon transmitters when no such change occurred, thereby overcoming OS policies that would ordinarily prevent a single beaconing device from repeatedly waking an application, or having the application run continuously when in range of the same beaconing device.

FIG. 1 illustrates transmission of a changing beacon from beaconing device 110 in accordance with some embodiments described herein. Beaconing device 110 may be a beacon transmitter from the system of one or more beaconing devices, wherein each beaconing device of the system may transmit synchronized changing beacons in accordance with some embodiments described herein.

As shown, beaconing device 110 wirelessly transmits first beacon 120 during first time 125, second beacon 130 during second time 135, third beacon 140 during third time 145, and fourth beacon 150 during fourth time 155. Each of first, second, third, and fourth beacons 120, 130, 140, and 150 may be different unique values. Beaconing device 110 may then cycle through and repeat transmission of first beacon 120, second beacon 130, third beacon 140, and fourth beacon 150. For instance, beaconing device 110 may transmit first beacon 120 during fifth time 160 after fourth time 155.

Beaconing device 110 may transmit each beacon 120, 130, 140, and 150 using a short-range wireless network technology such as Bluetooth Low Energy ("BLE"), Bluetooth, or Near Field Communication ("NFC"), or a long-range wireless network technology such as WiFi, Long Term Evolution ("LTE"), or Next Generation ("5G"). The transmission range of beaconing device 110 varies according to the wireless network technology that is used for transmission, and/or by increasing or decreasing the power allocated to the wireless radio and/or antenna of beaconing device 110 used to transmit beacons 120, 130, 140, and 150.

Beaconing device 110 may be configured to transmit additional or fewer beacons than beacons 120, 130, 140, and 150. In some embodiments, beaconing device 110 may be configured to transmit twenty different beacons. Beaconing device 110 may cycle through the different beacons sequentially or in a non-sequential pattern with other beaconing devices.

Beaconing device 110 may transmit each beacon for an equal amount of time or for different amounts of times. In FIG. 1, beaconing device 110 is shown to transmit each beacon 120, 130, 140, and 150 for ten second intervals corresponding to first time 125, second time 135, third time 145, and fourth time 155. The transmission duration for each beacon may be configurable.

The frequency with which beaconing device 110 transmits each beacon during the respective time interval may also be configurable. For instance, beaconing device 110 may retransmit first beacon 120 every half second during first time 125.

Beacon transmission may include beaconing device 110 advertising or broadcasting beacons 120, 130, 140, and 150 during the respective time intervals 125, 135, 145, and 155 such that any mobile device that is in transmission range of beaconing device 110 can receive beacons 120, 130, 140, and 150 without establishing a connection or otherwise communicating with beaconing device 110. Each beacon 120, 130, 140, and 150 may be a single packet or identifier.

A mobile device may receive beacons 120, 130, 140, and 150 with a wireless radio that operates using the same wireless network technology (e.g., BLE, Bluetooth, NFC, WiFi, etc.) that beaconing device 110 uses to transmit beacons 120, 130, 140, and 150 when in beaconing range of beaconing device 110. For instance, when transmitting via BLE, the mobile device may be able to detect beacons 120, 130, 140, and 150 up to seventy meters from beaconing device 110.

FIG. 2 illustrates a format for beacons transmitted from beaconing device 110 in accordance with some embodiments described herein. Each beacon may include Universal Unique Identifier ("UUID") 210, major code 220, and minor code 230. Beaconing device 110 may support any beacon format used by iOS devices (e.g., "iBeacon"), Android devices (e.g., Eddystone beacons), other mobile devices, Bluetooth, BLE communications, and/or other communication or networking technologies.

UUID 210 may be sixteen bytes for uniquely identifying a particular entity. For instance, multiple beaconing devices from a specific access control service provider may advertise UUID 210 that is assigned to that specific access control service provider. Alternatively, multiple beaconing devices installed for a particular business may advertise UUID 210 for the particular business. In some embodiments, multiple beaconing devices associated with a given business or entity may be configured to transmit the same UUID 210.

Major code 220 and minor code 230 may be different two-byte values. Beaconing device 110 may vary major code 220 and/or minor code 230 to produce the changing beacons. Ordinarily, major code 220 and minor code 230 are defined for differentiating between different beaconing devices with each beaconing device having a different major code 220 and/or minor code 230 combination that it statically transmits. In some embodiments, the one or more beaconing devices of a common system may synchronously transmit a first beacon (e.g., first beacon 120) with a first major code and/or minor code combination during a first interval (e.g., first time 125), and may synchronously transmit a second beacon (e.g., second beacon 130) with a different second major code and/or minor code combination during a second interval (e.g., second time 135).

FIGS. 3A, 3B, 3C, and 3D illustrate beaconing device 110 providing changing beacons for continuous operation of an application on mobile device 310 in accordance with some embodiments described herein. Specifically, FIGS. 3A, 3B, 3C, and 3D illustrate using the changing beacons from one beaconing device 110 to trigger and maintain execution of the application on mobile device 310 while mobile device 310 is in a locked or standby state, and while mobile device 310 stays within beaconing range of beaconing device 110.

FIGS. 3A, 3B, 3C, and 3D illustrate using beaconing device 110 for wirelessly and securely requesting and obtaining access to secured resource 320 via mobile device 310 without user 315 interacting with mobile device 310 during the entire procedure. Specifically, beaconing device 110 is used to trigger execution of an entry access application on mobile device 310, and to ensure that the application remains running. Accordingly, the entry access application may perform an authorization procedure for authorizing access to secured resource 320 adjacent to beaconing device 110 at a first time when mobile device 310 enters in range of beaconing device 110, and an intent confirmation procedure at a second time when mobile device 310 nears secured resource 320. The time between when the procedures are performed may be irrelevant as the beaconing device's 110 use of a continually changing beacon ensures that the OS of mobile device 310 does not close and keep the entry access application closed in between the first time and the second time. Other use cases requiring triggering and maintaining execution of an application for an extended period of time via the same beaconing device apply, and can be performed according to the implementation illustrated by FIGS. 3A, 3B, 3C, and 3D.

Figure 3A:
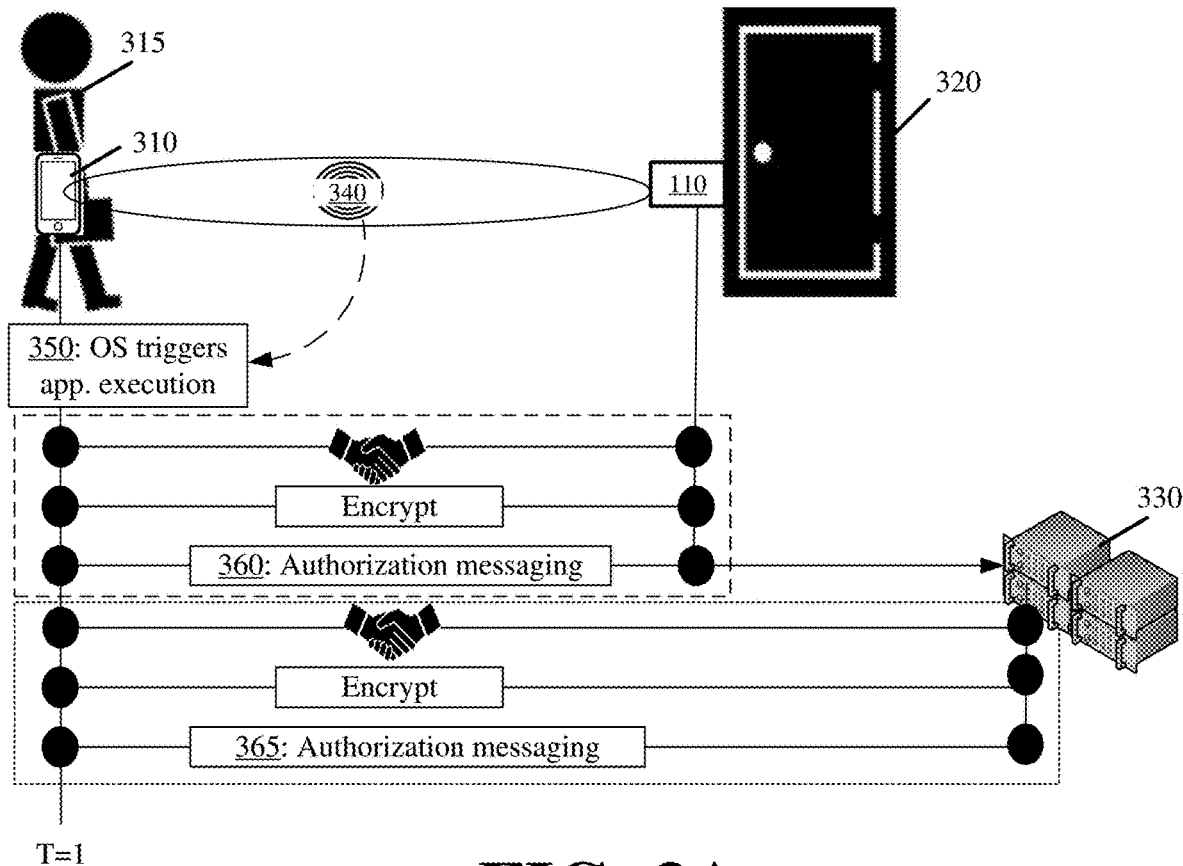
FIGS. 3A, 3B, 3C, and 3D illustrate a beaconing device providing changing beacons for continuous operation of an application on a mobile device in accordance with some embodiments described herein.

As shown in FIG. 3A, beaconing device 110 may transmit first beacon 340 at a first time. Beaconing device 110 may transmit first beacon 340 and other changing beacons via BLE with a configurable range of up to 100 meters (i.e., 328 feet).

During the first time, mobile device 310, carried by user 315, enters in range of beaconing device 110. Mobile device 310 may receive first beacon 340. The OS running on mobile device 310 determines that first beacon 340 is registered to an entry access application that is installed on mobile device 310, and that is currently closed or otherwise not running. In response to receiving first beacon 340, and determining that first beacon 340 is registered to the entry access application, the OS may trigger (at 350) execution of the entry access application to wake the application from a closed or inactive state while mobile device 310 is in a locked or standby state.

Triggering execution of the application causes the application to run in the foreground and/or background of mobile device 310. The OS may also provide first beacon 340 to the entry access application. If the application is already running on mobile device 310, because of user 315 manually triggering execution or other reasons, the OS may reset a timer associated with closing the entry access application, and may provide first beacon 340 to the running instance of the application.

Upon triggering execution of the entry access application, the entry access application may detect beaconing device 110 transmitting first beacon 340. For instance, mobile device 310 may detect addressing, a name, and/or other identifiers of beaconing device 110 over the same or different wireless network used by beaconing device 110 to transmit first beacon 340. In some embodiments, the application may provide an inquiry request via a Bluetooth radio of mobile device 310, and beaconing device 110 may respond to the inquiry request by providing its name and/or other identifiers for connecting to beaconing device 110. In some embodiments, the application may scan the OS and/or one or more wireless radios of mobile device 310 for device identifiers that are wirelessly advertised over a first wireless network, and that identify any of a set of beaconing devices that the entry access application is configured to communicate with in order to request entry access to secured resource 320 and/or other secured resources. For instance, in addition to transmitting first beacon 340, beaconing device 110 may advertise a Service Set Identifier ("SSID"), a Bluetooth name, or other identifier that mobile device 310 can detect upon entering in range of beaconing device 110. The entry access application may obtain the beaconing device 110 identifier from the OS or one or more mobile device 310 wireless radios. The application may determine that the identifier identifies beaconing device 110 of a configured entry access control system based on a format or naming convention of the identifier.

The entry access application, via a wireless radio of mobile device 310, may then perform a handshaking procedure to wirelessly connect to beaconing device 110 and encrypt the connection. In some embodiments, the application may establish a Transport Layer Security ("TLS") secure connection with beaconing device 110. In the event that mobile device 310 enters in range of multiple beaconing devices 110 (e.g., that the application is configured to communicate with), the application may establish a connection with each such beaconing device 110 if a preexisting secure connection does not exist to each beaconing device 110.

The application may also perform (at 360) an authorization procedure with beaconing device 110 over the secure connection. The authorization procedure may include the application providing access credentials to beaconing device 110. The access credentials may include a username and password combination, an authentication token, and/or other messaging for uniquely identifying mobile device 310 and/or user 315 associated with mobile device 310.

Beaconing device 110 may determine whether mobile device 310 is permitted access to secured resource 320 based on the access credentials, and/or messaging exchanged during the authorization procedure. Beaconing device 110 may locally authorize access. In some such embodiments, beaconing device 110 stores a list of access credentials that are permitted to access secured resource 320. In some embodiments, beaconing device 110 may provide the access credentials, obtained from mobile device 310, to access control unit ("ACU") 330, and ACU 330 may determine whether mobile device 310 is permitted access to secured resource 320. ACU 330 may store access control lists that specify different users 315, mobile devices 310, and/or access credentials that are permitted access to different secured resources 320 under control of ACU 330.

In some embodiments, performing the authorization procedure may also include the entry access application establishing a secure connection with ACU 330, via a second long-range wireless radio of mobile device 310, and performing (at 365) the authorization procedure directly with ACU 330 in addition to or instead of performing the authorization procedure with or through beaconing device 110. The authorization through the first wireless network connection to beaconing device 110, and the second wireless network connection to ACU 330 may be performed for performance and/or redundancy reasons.

Successful authorization indicates that mobile device 310 and/or user 315, based on the provided access credentials, are permitted access to secured resource 320. The authorization result may be retained by beaconing device 110 and/or ACU 330. In other words, if mobile device 310 is authorized to access secured resource 320 based on the provided access credentials, the decision is stored, and access to secured resource 320 is not granted until mobile device completes a second intent confirmation procedure.

Figure 3B:
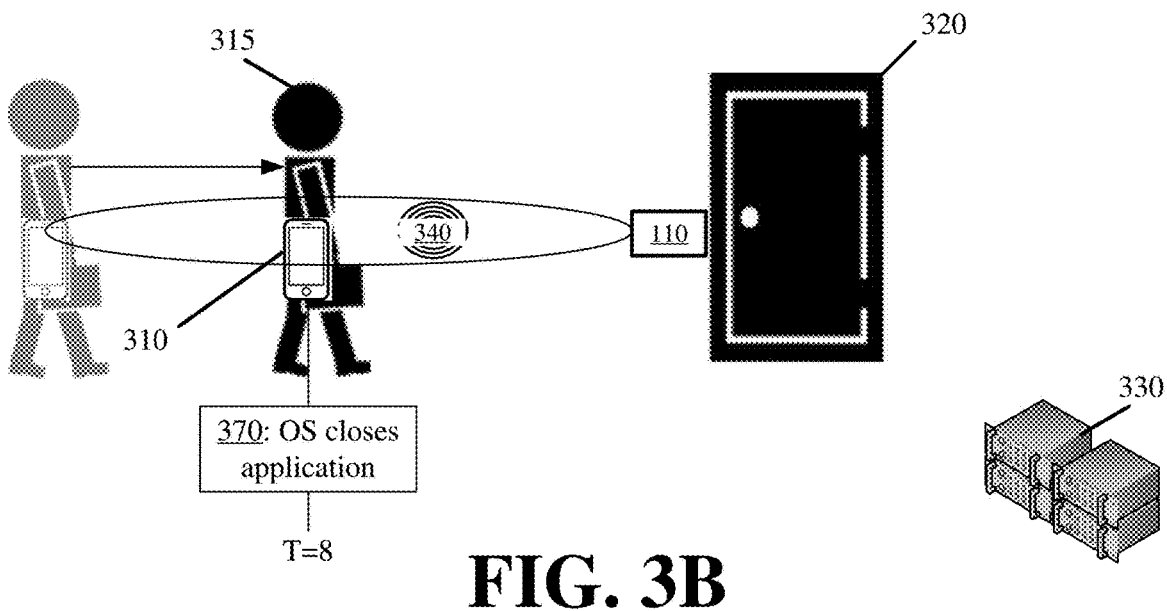

FIG. 3B illustrates a passage of time during which user 315 with mobile device 310 moves closer to beaconing device 110 and secured resource 320, and beaconing device 110 continues to advertise first beacon 340. During this passage of time, the OS of mobile device 310 may close (at 370) the entry access application. The OS may close the application because the application has been idle for too long, to free resources for other applications, preserve battery, and/or other reasons.

Figure 3C:
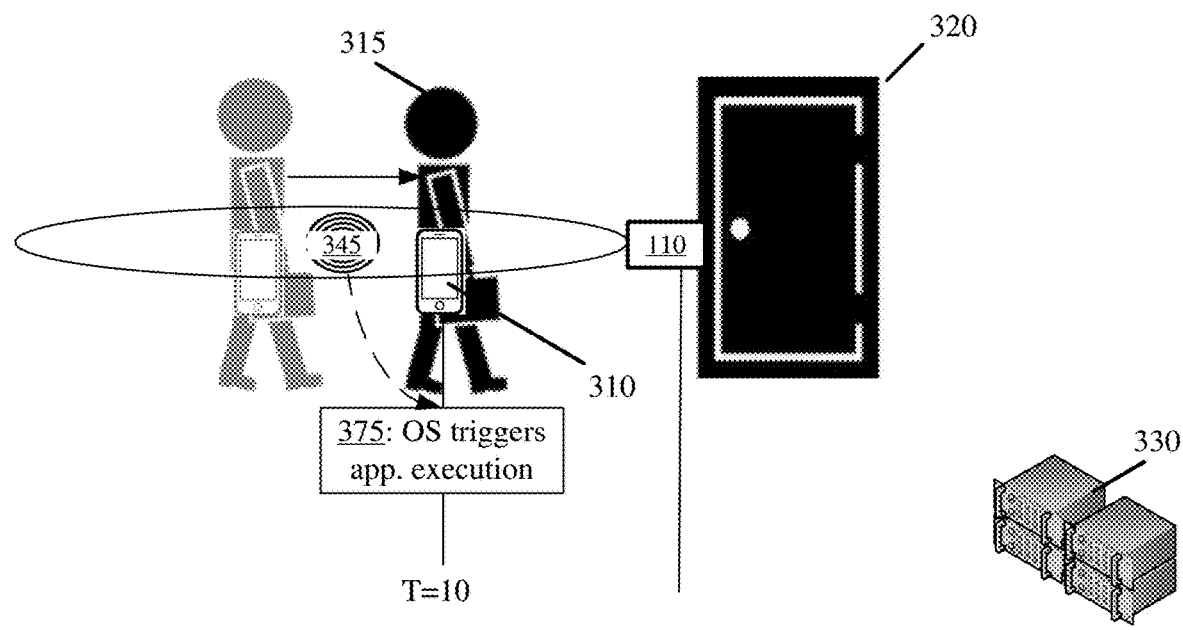

FIG. 3C illustrates additional passage of time during which beaconing device 110 changes from advertising first beacon 340 to advertising second beacon 345, and user 315 with mobile device 310 moves even closer to beaconing device 110 and secured resource 320. Mobile device 310 remains in range of beaconing device 110, and receives second beacon 345.

The OS running on mobile device 310 determines that second beacon 345 is registered to the entry access application that was recently closed (at 370), and further determines that second beacon 345 has not been used over a past interval to trigger execution of the entry access application. Accordingly, the OS may trigger (at 375) execution of the entry access application based on second beacon 345, once again waking the application from the closed or inactive state. Here again, execution of the entry access application may be triggered even with the mobile device 310 being in a locked or standby state and without user 315 interacting with mobile device 310 in any way.

The application may detect that beaconing device 110 remains in range, may determine that mobile device 310 has not entered in range of other beaconing devices (e.g., remains in range of beaconing device 110), may determine that the authorization procedure was successfully completed with beaconing device 110 and/or ACU 330 for secured resource 320, and/or that the authorization result has not expired as a result of having been conducted within a timeout interval. In other words, when the application performed (at 360 and 365) the authorization procedure, the authorization to access secured resource 320, if successful, may remain valid for some period of time during which user 315 must confirm intent to access secured resource 320 before access to secured resource 320 is provided. If the timeout interval and validity of the authorization result expire, the application may reperform the authorization procedure.

Figure 3D:
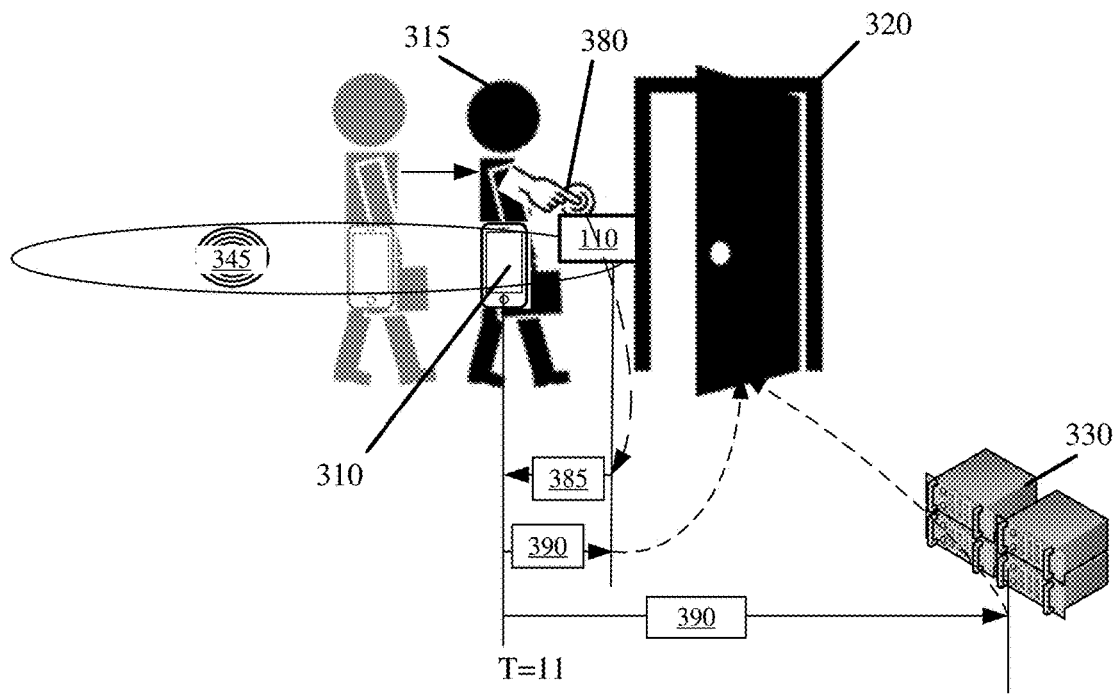

FIG. 3D illustrates additional passage of time during which user 315 with mobile device 310 arrives before beaconing device 110, and performs gesture 380 for confirming intent to access secured resource 320. Gesture 380 can be any action that demonstrates an intent by user 315 to access secured resource 320, and is an action that is detected by beaconing device 110 without user 315 interacting with mobile device 310. For instance, gesture 380 may include a simple touch of beaconing device 110, or pressing a button of beaconing device 110. Gesture 380 may also include a user movement, sound, or other action that is detected by a camera, microphone, or other sensor of beaconing device 110.

Gesture 380 initiates the intent confirmation procedure, and causes beaconing device 110 to determine the closest mobile device that has an established connection with beaconing device 110, and/or to determine if the closest mobile device is within a specific distance (e.g., several inches) from beaconing device 110. Beaconing device 110 may determine that mobile device 310 is closest to beaconing device 110 and/or within the specific distance by measuring the signal strength, time-of-flight, and/or other metrics from which mobile device 310 distance to beaconing device 110 can be determined.

In response to determining that mobile device 310 is closest to beaconing device 110 and/or within the specific distance, beaconing device 110 may further determine, via ACU 330 or independently, that mobile device 310 was successfully authorized to access secured resource 320 based on the authorization procedure completed during the sequence at FIG. 3A. Beaconing device 110 may then provide (at 385) an access request message to mobile device 310 via the secure connection between beaconing device 110 and mobile device 310 over the first wireless network. In some embodiments, the access request message may contain a temporary code that mobile device 310 can provide to beaconing device 110 and/or ACU 330 in order to obtain access to secured resource 320. Since execution of the entry access application was retrigged by second beacon 345, the application is able to receive the access request message, and may provide (at 390) an access confirmation message to beaconing device 110 and/or ACU 330. The access confirmation message may return the temporary code. In response to the access confirmation message, beaconing device 110 and/or ACU 330 may then provide mobile device 310 access to secured resource 320. In this case, secured resource 320 is a locked door that is unlocked upon receipt of the access confirmation message.

In some embodiments, beaconing device 110 does not provide (at 385) the access request message to mobile device 310, and instead immediately provides access to secured resource 320 in response to (i) confirming the intent to access by detecting gesture 380 and determining that mobile device 310 is closest to beaconing device 110 and/or within the specific distance, (ii) that mobile device 310 successfully completed the authorization procedure, and (iii) that the authorization result is still valid (e.g., has not expired).

In some embodiments, access to secured resource 320 is automatically provided by beaconing device 110 without user 315 performing gesture 380. In some such embodiments, beaconing device 110 continually monitors signal strength, time-of-flight, and/or other distance measurements for mobile device 110 and other mobile devices connected to beaconing device 310. In response to detecting that beaconing device 110 is within the specific distance (e.g., a few inches) from beaconing device 310, beaconing device 110 may determine that mobile device 310 has successfully completed the intent confirmation procedure, and may provide mobile device 310 access to secured resource 320 by directly controlling secured resource 320 or by messaging ACU 330 to provide access to secured resource 320.

Figure 4:
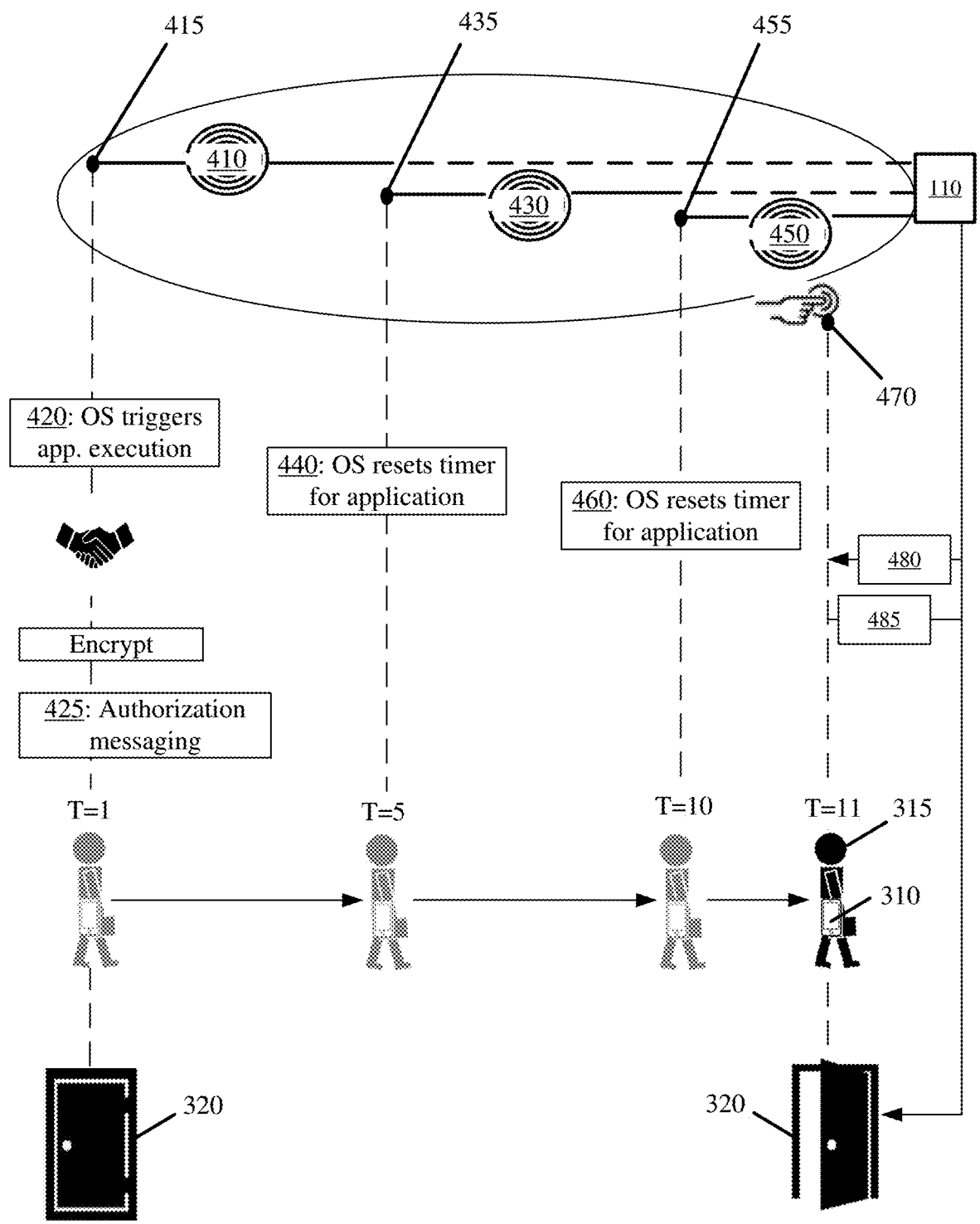
FIG. 4 illustrates a beaconing device a frequent changing of beacons transmitted by a beaconing device to prevent an application on a mobile device from closing.

In some embodiments, beaconing device 110 changes the advertised beacons more frequently to prevent the OS from closing the application whose execution is triggered by the advertised beacons. FIG. 4 illustrates beaconing device 110 changing beacons more frequently to allow the application on mobile device 310 to automatically obtain access to secured resource 320 without the application being closed when performing the authorization procedure separate and at a different time than the intent confirmation procedure.

FIG. 4 illustrates beaconing device 110 advertising first beacon 410, mobile device 310 entering in range of beaconing device 110, and mobile device 310 receiving first beacon 410 at first time 415. In response to receiving first beacon 410, and the OS of mobile device 310 determining that first beacon 410 is registered to the entry access application installed on mobile device 310, the OS triggers (at 420) execution of the entry access application. The entry access application may establish a connection with beaconing device 110, secure (e.g., encrypt) the connection, and/or perform (at 420) the authorization procedure with beaconing device 110 and/or ACU 330.

Beaconing device 110 may advertise second beacon 430 at second time 435. Mobile device 310 may have moved closer to beaconing device 110 by second time 435, but no gesture or other action has been performed to perform the intent confirmation procedure. The halted advertising of first beacon 410, and the advertising of second beacon 430 trick the OS of mobile device 310 into detecting that mobile device 310 has moved out of range of the transmitter advertising first beacon 410 and into range of a different transmitter advertising second beacon 430 even though first and second beacons 410 and 430 are advertised by the same beaconing device 110. Accordingly, in response to mobile device 310 receiving second beacon 430, the OS of mobile device 310 may determine that second beacon 430 is registered to the entry access application, may determine that second beacon 430 was not received during a prior interval, and may determine that the entry access application is currently running. Consequently, the OS allows the application to continue running. The OS may also reset (at 440) a timer or other condition that controls when the OS closes the entry access application.

Beaconing device 110 may advertise third beacon 450 at third time 455 to once again reset (at 460) the OS timer for the entry access application, and to keep the application running as mobile device 310 is moved closer to beaconing device 110. At fourth time 470, user 315 associated with mobile device 310 may perform a gesture to trigger execution of the intent confirmation procedure. Beaconing device 110 may detect that authorized mobile device 310 is closest to beaconing device 110, and may provide (at 480) an access request message to mobile device 310 over the existing secure connection, and mobile device 310 may provide (at 485) an access confirmation message to beaconing device 110 and/or ACU 330 which causes beaconing device 110 and/or ACU 330 to provide mobile device 310 access to secured resource 320.

In FIG. 4, the entry access application continuously runs on mobile device 310 because of the more frequent changing of advertised beacons. In particular, beaconing device 110 changes the beacons before the OS timer for closing the application expires. Nevertheless, in FIGS. 3A-3D and 4, user 315 gains access to secured resource 320 without retrieving and/or interacting with mobile device 310 even though mobile device 310 securely and automatically exchanges messaging with beaconing device 110 and/or ACU 330 while in a locked or standby state and without exiting beaconing range of beaconing device 110.

Figure 5:
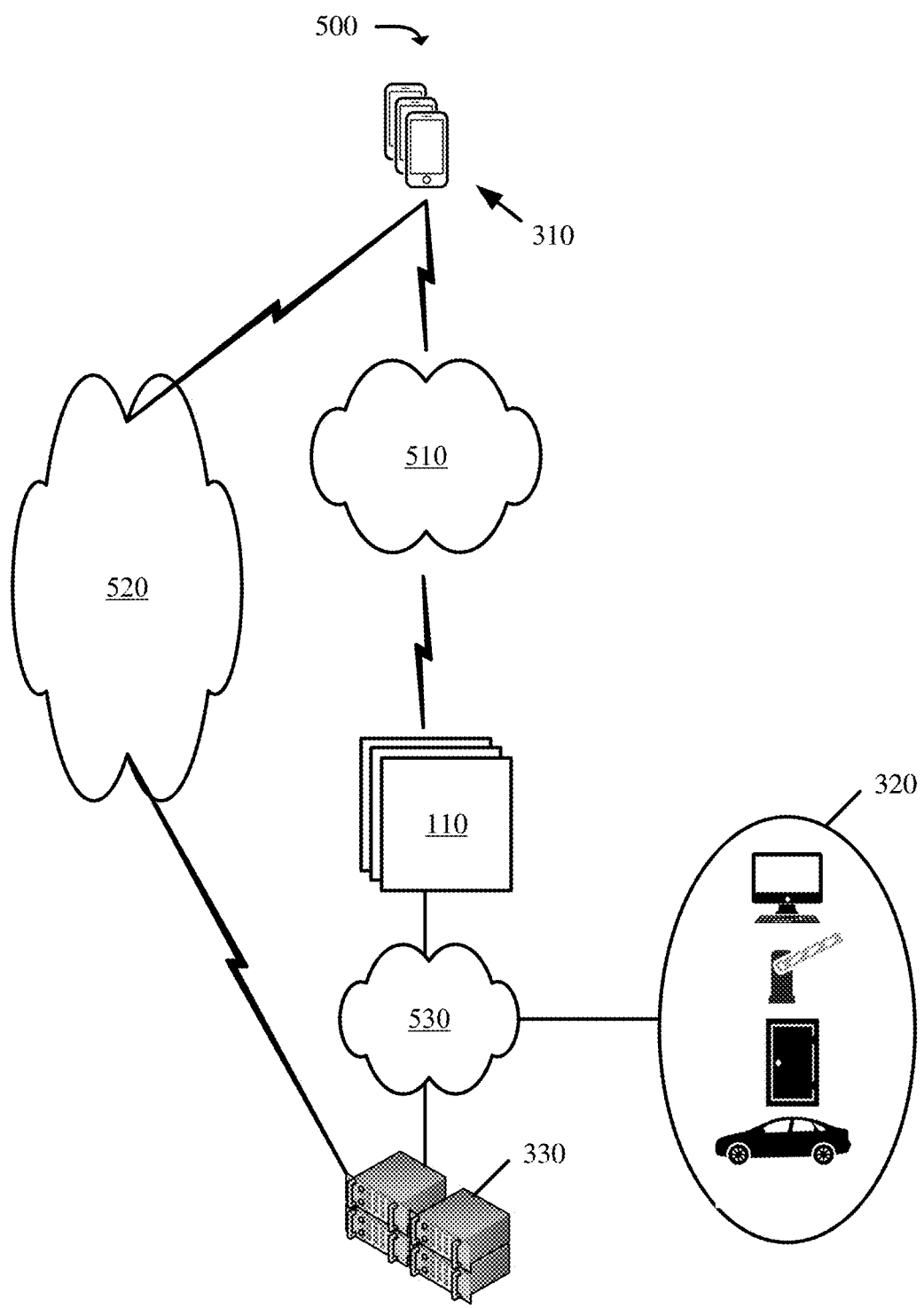
FIG. 5 illustrates a system that operates with changing beacons in accordance with some embodiments described herein.

FIG. 5 illustrates system 500 that operates with changing beacons in accordance with some embodiments described herein. System 500 may include one or more mobile devices 310, first wireless network 510, second wireless network 520, one or more beaconing devices 110, back-haul network 530, one or more secured resources 320, and ACU 330.

Mobile devices 310 may include any battery-operated device that can be carried by a user, and that includes at least one wireless radio for wireless communication over first wireless network 510. For instance, mobile devices 310 may include one or more radios for wirelessly communicating using Near Field Communication ("NFC"), Bluetooth, WiFi, LTE, Next Generation ("5G"), and/or other wireless networking technologies. In some implementations, mobile devices 310 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, an Internet-of-Things ("IoT") device, a wearable device, and/or other portable battery operated device that can be carried on one's person.

Mobile devices 310 may further include devices that have a processor, memory, and storage, and that execute an OS and one or more applications. The one or more applications may run atop the OS and may be managed by the OS. For instance, the OS may allocate processing, memory, and/or other resources to running applications, and may further manage power of the mobile device by closing applications based on various power management policies and/or other criteria. The OS may also provide a beaconing service that may trigger execution of different applications in response to receiving different sets of beacons that are registered to the different applications. Each set of beacons may specify one or more identifiers with different UUIDs, major codes, and/or minor codes that may be used to trigger execution of a particular application. The particular application may register a set of beacons with the OS when the particular application is installed or first run. The set of beacons may also be changed programmatically by the application provider via over-the-air updates in some embodiments.

Figure 6:
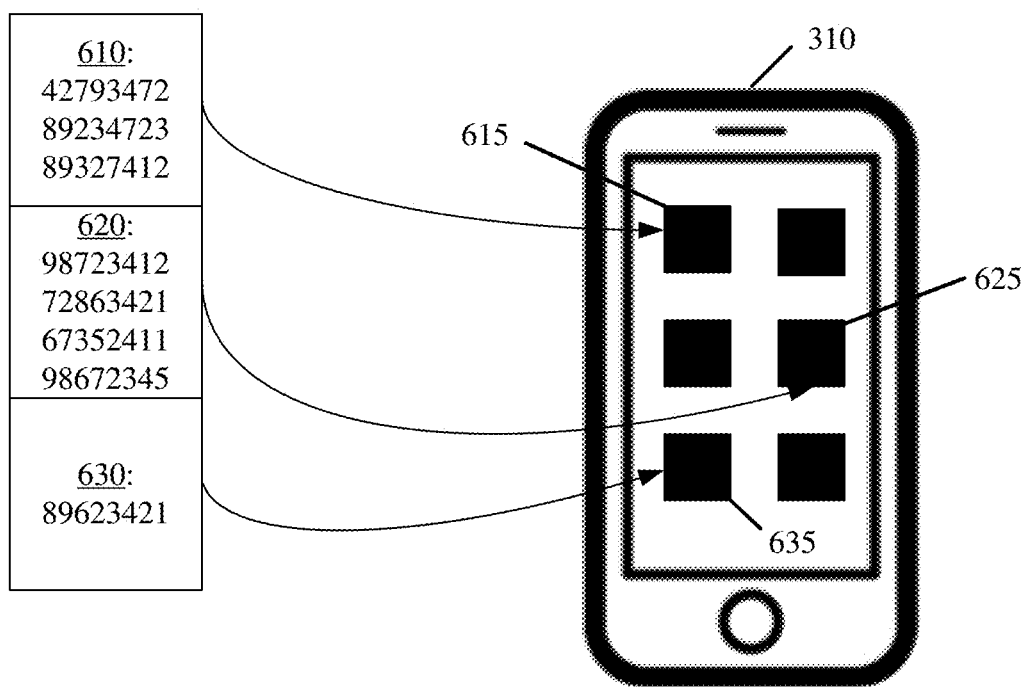
FIG. 6 conceptually illustrates different set of beacons that are registered with an operating system ("OS") of a mobile device, and that can be used to trigger execution of different applications installed on the mobile device in accordance with some embodiments described herein.

FIG. 6 conceptually illustrates different set of beacons 610, 620, and 630 that are registered with the OS of mobile device 310, and that can be used to trigger execution of different applications 615, 625, and 635 installed on mobile device 310 in accordance with some embodiments described herein. As shown, first set of beacons 610 includes three OS registered beacons that may trigger execution of first application 615, second set of beacons 620 includes four OS registered beacons that may trigger execution of second application 625, and third set of beacons 630 includes one OS registered beacon that may trigger execution of third application 635.

With reference back to FIG. 5, first wireless network 510 may be based on a short-range network technology such as BLE, Bluetooth, or NFC. Although in some embodiments, first wireless network 510 may be based on a long-range network technology such as WiFi, LTE, or 5G. Communications between mobile devices 310 and beaconing devices 110 occur over first wireless network 510. In particular, beaconing devices 110 may advertise the changing beacons, and exchange the authorization and access request procedure messaging via first wireless network 510. In some embodiments, beaconing devices 110 may advertise the changing beacons using a different wireless network or wireless network technology than used for mobile device 310-to-beaconing device 110 communications. For instance, BLE may be used to transmit the beacons because of BLE's low power requirements, and Bluetooth may be used for exchanging the messaging used to establish a secure connection, perform the authorization procedure, perform the intent confirmation procedure, and/or perform other procedures or operations.

Beaconing devices 110 have at least a first wireless radio for advertising the changing beacons, and for communicating with mobile devices 310 via first wireless network 510. Beaconing devices 110 may have one or more sensors for detecting gesture 380 that initiates the intent confirmation procedure. Examples of some sensors are cameras, microphones, touch sensors, time-of-flight sensors, and light sensors.

Beaconing devices 110 may also function as access control readers that authorize and/or provide access based on one or more access card technologies. For instance, beaconing devices 110 may have one or more wireless radios that operate at 125 kilohertz for communicating with proximity cards, and/or that operate at 13.56 megahertz for communicating with smartcards. In some such embodiments, beaconing devices 110 may include an excitation circuit for producing a magnetic field that supplies power to nearby access cards.

Each beaconing device 110 may be placed adjacent to a different secured resource 320, and may serve as the wireless communication hub with which mobile devices 310 may request access to the secured resource 320. Each beaconing device 110 may use back-haul network 530 to communicate with a corresponding secured resource 320 and/or ACU 330. Back-haul network 530 may provide a wired or wireless network connection to secured resource 320 and/or ACU 330. Using back-haul network 530, beaconing device 110 may signal secured resource 320 to provide or restrict access. Using back-haul network 530, beaconing device 110 may proxy authorization and/or other messaging to ACU 330.

Secured resource 320 may include any physical or digital asset that can be remotely locked and unlocked, closed and opened, or otherwise made inaccessible and accessible. In some embodiments, secured resource 320 may be a door, window, gate, or other physical barrier with a controllable locking or closing mechanism. In some embodiments, secured resource 320 may be a computer, vehicle, or other system with restricted access.

ACU 330 may be a management device that interfaces with one or more beaconing devices 110 and/or secured resources 320 using back-haul network 530. ACU 330 may configure beaconing devices 110, perform mobile device 310 or user 315 authorization in conjunction with or on behalf of beaconing devices 110, may control access to secured resources 320, and/or may perform other operations with respect to beaconing devices 110 or secured resources 320. For instance, an administrator may access ACU 330 to configure the beaconing range of each beaconing device 110. The administrator may configure the power that is allocated to the antenna of each beaconing device 110 and/or the power used to advertise the beacons.

ACU 330 may also directly or indirectly communicate with mobile devices 310 for authorization, intent confirmation, and/or other purposes. ACU 330 may directly communicate with mobile devices 310 via second wireless network 520, and may indirectly communicate with mobile devices 310 when beaconing devices 110 proxy messaging from mobile devices 310 to ACU 330 via back-haul network 530. For instance, when mobile device 310 connects to beaconing device 110, mobile device 310 may provide various identifying or authorization information to beaconing device 110. Beaconing device 110 may forward the identifying or authorization information to ACU 330 using back-haul network 530, and ACU 330 may authorize or deny mobile device 310 access to secured resource 320. In some embodiments, ACU 330 may provide the authorization result to beaconing device 110. In some other embodiments, ACU 330 may store a successful authorization result, and may use the authorization result to provide mobile device 310 access to secured resource 320 if mobile device 310 completes the intent confirmation procedure in a certain amount of time before the authorization result expires and is no longer valid.

Second wireless network 520 may be a long-range wireless networking technology such as WiFi, LTE, or 5G. Second wireless network 520 may also include one or more wired links or network hops for connecting mobile device 310 to ACU 330.

In some embodiments, the OS may restrict the number of beacons that each application may register and/or may be used to trigger execution of the application. For instance, the OS may prevent a particular application from registering more than twenty different beacons that can be used to trigger execution of that particular application. Different OS' s may have different restrictions on the number of beacons that can be registered for a given application.

The limitation on the number of beacons that can be registered for an application may present an obstacle for an application that is used with a system having a large deployment of beaconing devices 110. For instance, an access control system may use thirty different beaconing devices 110 to control access to thirty different secured resources 320, and a single application may be used to authorize and request access to each of the thirty secured resources 320. If the OS restricts the application to registering only twenty beacons, each beaconing device 110 cannot advertise its own unique beacon. Moreover, if each beaconing device 110 randomly selects one of the twenty registered beacons to advertise, a situation may arise in which mobile device 310 may be in range of two or more beaconing devices 110, and the two or more beaconing devices 110 alternate between advertising the same beacon at different times. In such a situation, the OS may continue to see the same beacon even though it is advertised from different beaconing devices 110, and may close the application after some amount of time as a result.

Accordingly, some embodiments provide a system that includes one or more beaconing devices 110 that transmit synchronized changing beacons. For instance, two or more beaconing devices 110 operating as part of the same system may advertise the same first beacon during a first time, and may simultaneously and/or contemporaneously advertise the same second beacon during a second time. As a result of the synchronized changing beacons, each beacon change and each beacon that is advertised from beaconing devices 110 of a common system cause mobile device 310 to detect that it is in range of a new beaconing device 110 regardless of whether mobile device 110 is in range of two or more beaconing devices 110 of the same system, or mobile device 110 moves between two or more beaconing devices 110 as the advertised beacons change.

In some embodiments, two or more beaconing devices 110 synchronize their internal clocks with ACU 330 of the same system. Beaconing devices 110 operating as part of the same system may be configured with the same set of beacons and the same beacon selection criteria. For instance, each beaconing device 110, operating as part of the same system, may be configured to advertise the same twenty beacons in the same order. The beacon selection criteria may select a specific beacon from the set of configured beacons based on the synchronized clock of beaconing device 110 and/or the current time. Beaconing devices 110 may change beacons at a recurring interval. For instance, a hash of the time at the same ten second interval may be used to select a different beacon to advertise every ten seconds. To correct for clock drift, beaconing devices 110 may periodically synchronize their internal clocks with ACU 330.

Figure 7:
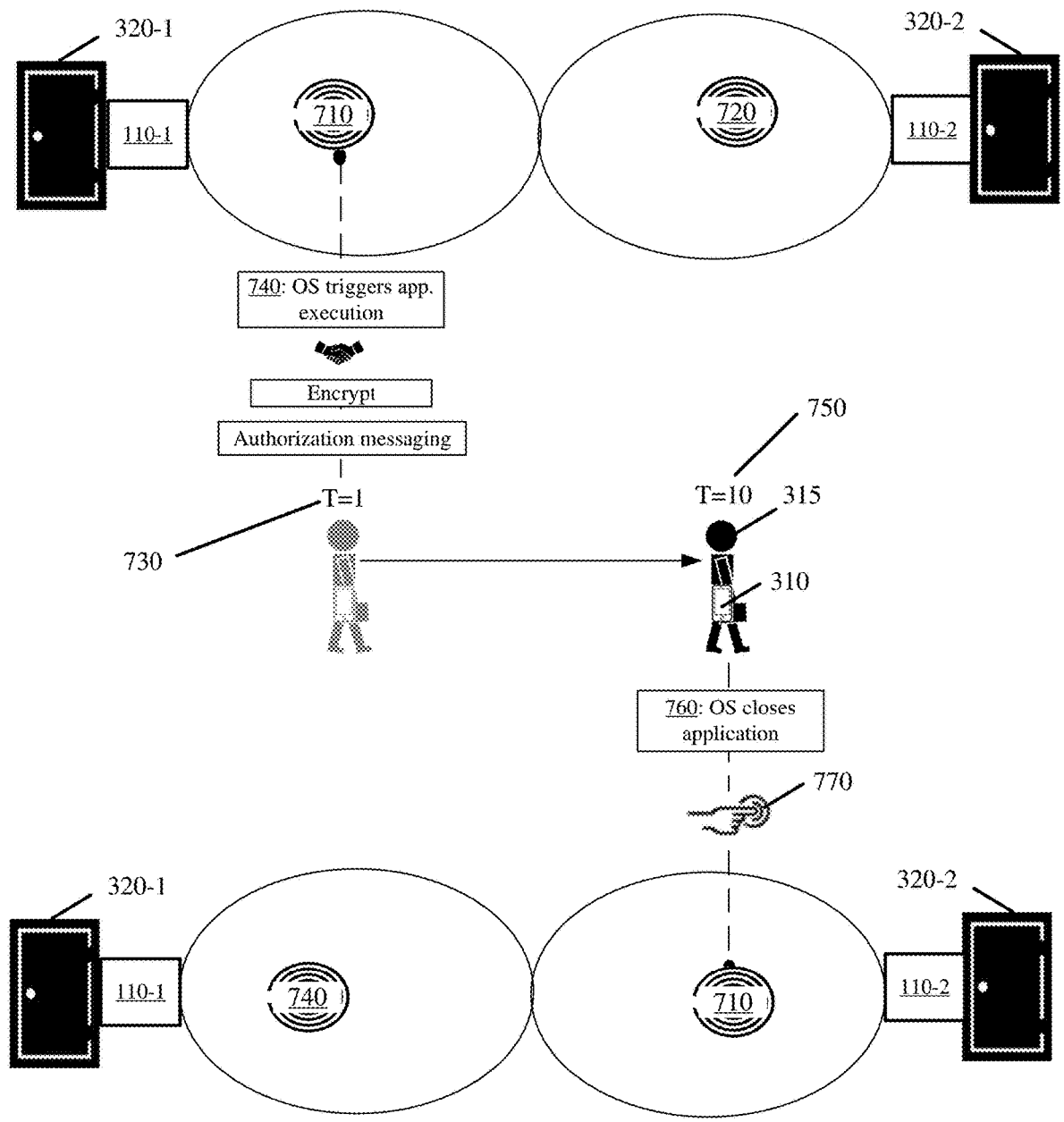
FIG. 7 illustrates an example of undesired closing of an application because of unsynchronized changing beacons that are advertised from different beaconing devices.
Figure 8:
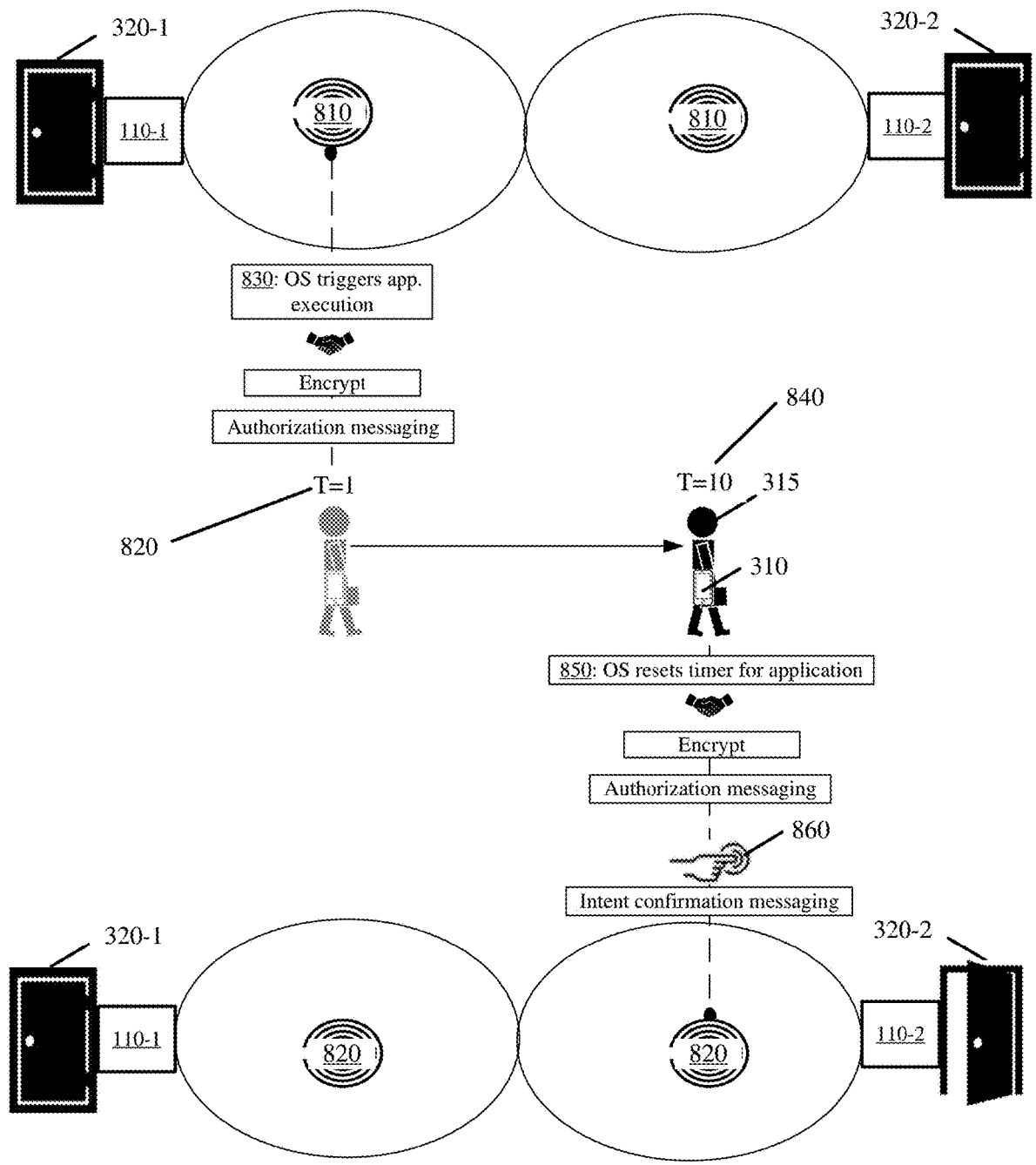
FIG. 8 illustrates an example of maintaining continuous operation of an application because of synchronized changing beacons that are advertised from different beaconing devices in accordance with some embodiments described herein.

FIG. 7 illustrates an example of undesired closing of an application because of unsynchronized changing beacons that are advertised from beaconing devices 110-1 and 110-2 (herein sometimes collectively referred to as "beaconing devices 110" or individually as "beaconing device 110"). FIG. 8 illustrates an example of maintaining continuous operation of an application because of synchronized changing beacons that are advertised from beaconing devices 110-1 and 110-2 in accordance with some embodiments described herein. In FIGS. 7 and 8, beaconing device 110-1 is associated with secured resource 320-1 and may be used to request access to secured resource 320-1, and beaconing device 110-2 is associated with secured resource 320-2 and may be used to request access to secured resource 320-2.

FIG. 7 illustrates first beaconing device 110-1 advertising first beacon 710 that is not synchronized with second beacon 720 being advertised by second beaconing device 110-2 at first time 730. At first time 730, mobile device 310 may enter in range of first beaconing device 110-1, and may receive first beacon 710 from first beaconing device 110-1. In response to receiving first beacon 710, and determining that first beacon 710 is registered to a particular application, the OS of mobile device 310 may trigger (at 740) the particular application to wake from a sleep or closed state, and to begin executing on mobile device 310. The particular application may establish a secure connection with first beaconing device 110-1, and may authorize access to first secured resource 320-1.

FIG. 7 further illustrates first beaconing device 110-1 advertising third beacon 740 that is not synchronized with first beacon 710 being advertised by second beaconing device 110-2 at second time 750. At second time 750, mobile device 310 may enter in range of second beaconing device 110-2, and may receive first beacon 710 from second beaconing device 110-2. The OS of mobile device 310 may not detect the change from first beaconing device 110-1 to second beaconing device 110-2 because the same first beacon 710, received during first time 730 from beaconing device 110-1, is received during second time 750 from beaconing device 110-2. As a result, the OS does not reset the timer for closing the particular application. The particular application may run for some time on mobile device 310 before the timer expires and the OS closes (at 760) the particular application. With the particular application closed or no longer running, the authorization procedure and/or intent confirmation procedure for accessing secured resource 320-2 will be unable to complete, thereby preventing user 315 from obtaining access to secured resource 320-2 without directly interacting with mobile device 310. For instance, even if user 315 was to perform (at 770) a gesture that is detected by beaconing device 110-2 and that is used to trigger the intent confirmation procedure, the gesture will have no effect, and access to secured resource 320-2 will be denied because beaconing device 110-2 is unable to communicate with the closed application in order to authorize access and/or exchange messaging (e.g., access request and access confirmation messages) for providing access.

FIG. 8 illustrates first beaconing device 110-1 and second beaconing device 110-2 being synchronized so as to advertise the same first beacon 810 at first time 820. At first time, mobile device 820 may enter in range of first beaconing device 110-1, and may receive first beacon 810 from first beaconing device 110-1. In response to receiving first beacon 810, and determining that first beacon 810 is registered to the particular application, the OS of mobile device 310 triggers (at 830) the particular application to wake from a sleep or closed state, and to begin executing on mobile device 310. The particular application may establish a secure connection with first beaconing device 110-1, and may authorize access to first secured resource 320-1 associated with beaconing device 110-1.

At second time 840, first beaconing device 110-1 and second beaconing device 110-2 both switch and advertise second beacon 820. When mobile device 310 enters in range of second beaconing device 110-2 at second time 840, mobile device 310 may receive second beacon 820 from second beaconing device 110-2. The OS of mobile device 310 detects that second beacon 820 is registered to the particular application, and resets (at 850) the timer for closing the particular application, allowing the particular application to continue running without being closed.

While continuing to run during second time 840, the particular application may establish a secure connection with second beaconing device 110-2, and may authorize access to second secured resource 320-2 associated with second beaconing device 110-2. The particular application may remain running on mobile device 310 as user 315 moves with mobile device 310 closer to second beaconing device 110-2, and performs (at 860) a gesture for initiating the intent confirmation procedure. Beaconing device 110-2 may complete the intent confirmation procedure with the particular application running on mobile device 310, and may provide user 315 access to secured resource 320-2.

Beaconing devices 110 and the advertising of the synchronized changing beacons overcome the OS restrictions on beacon usage. Nevertheless, it is important to note that the OS restrictions were put in place to conserve power and resources. If an application that is triggered by the changing beacons is continuously running, then the application may deplete the battery of mobile device 310. For instance, in an office setting, user 315 may sit at a desk that is in range of beaconing device 110. Mobile device 310 of user 315 may receive the changing beacons from beaconing device 110 which may cause the application triggered by the changing beacons to continuously run and deplete the battery of mobile device 310.

Figure 9:
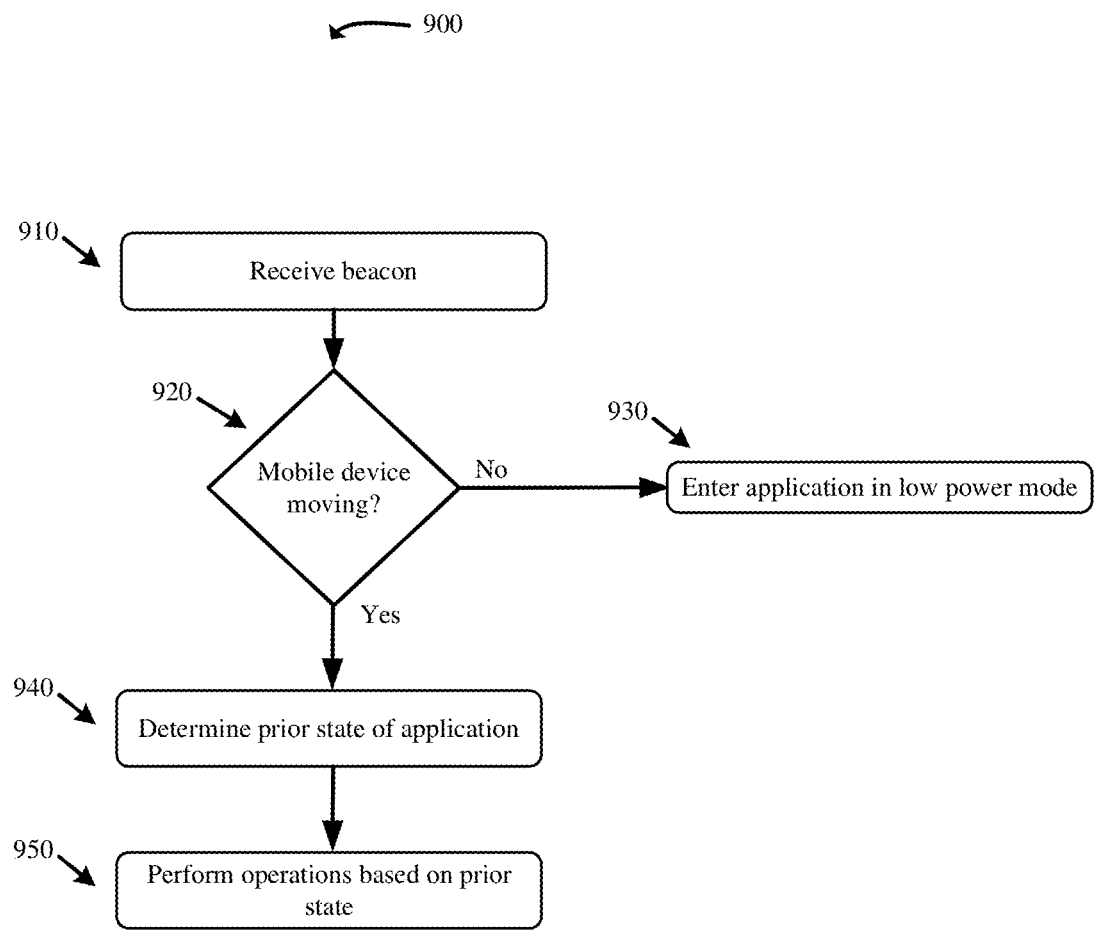
FIG. 9 presents a process for conserving mobile device power via an application that may continuously run when receiving changing beacons from a nearby beaconing device.

Accordingly, some embodiments implement battery conservation policies into the application that is triggered and runs in response to the synchronized changing beacons transmitted by beaconing devices 110. FIG. 9 presents process 900 for conserving mobile device power via an application that may continuously run when receiving changing beacons from a nearby beaconing device 110.

Process 900 may include receiving (at 910) a beacon at an application that is running on mobile device 310 or that is triggered by the beacon. The OS of mobile device 310 may provide the beacon and/or trigger execution of the application in response to mobile device 310 entering in range of beaconing device 110, and wirelessly receiving the changing beacon advertised by beaconing device 110.

To prevent the application from unnecessarily performing operations that may deplete the battery of mobile device 310, process 900 may include detecting (at 920) if mobile device 310 is moving. In some embodiments, the application interfaces with an accelerometer, GPS, or other sensor of mobile device 310 to detect (at 920) if mobile device 310 is moving. In some embodiments, a threshold amount of movement of mobile device 310 is required within a specific amount of time in order for the application to detect that mobile device 310 is moving as opposed to being stationary. For instance, user 315 seated in a chair with mobile device 310 in his pocket may produce minute movements of mobile device 310 that do not amount to the threshold amount of movement. Conversely, user 315 walking with mobile device 310 in his pocket may produce larger movements of mobile device 310 that are sufficient to exceed the threshold amount of movement.

In response to not detecting (at 920-No) a threshold amount of movement of mobile device 310 (e.g., detecting mobile device 310 to be stationary), process 900 may include entering (at 930) the application in a low power mode. In the low power mode, the application may periodically check for movement. Other operations performed by the application including the authorization, intent confirmation, and/or other procedures identified above may be halted until motion is detected.

In response to detecting (at 920-Yes) a threshold amount of movement of mobile device 310, process 900 may include determining (at 940) a prior state of the application, and performing (at 950) one or more operations and/or procedures based on the prior state. For example, if the application detects that mobile device 310 has entered in range of a new beaconing device 310, application may establish a secure connection with that beaconing device 310 and perform the authorization procedure. As another example, if the application detects that mobile device 310 is in range of one or more beaconing devices 110 to which the application is already connected, and application has completed the authorization procedure with each of the one or more beaconing devices 110, the application may continue running in the background until an access request message or other message for performing the access request procedure is received.

Figure 10:
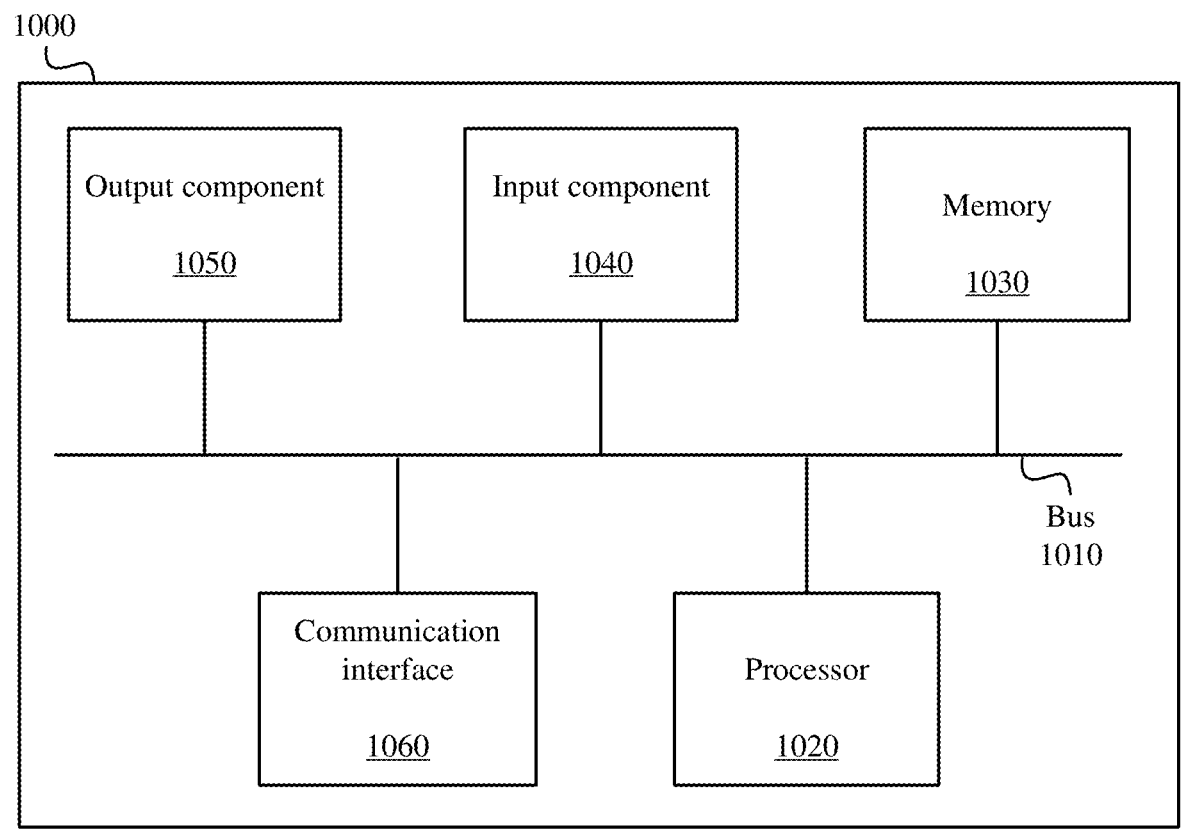
FIG. 10 illustrates example components of one or more devices, according to one or more embodiments described herein.

FIG. 10 is a diagram of example components of device 1000. Device 1000 may be used to implement certain of the devices described above (e.g., beaconing device 110, mobile device 310, and ACU 330). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
configuring automatic execution of a particular application on a mobile device based on a set of beacons that are registered to the particular application on the mobile device, wherein the particular application is configured with a two-phase access procedure to wirelessly obtain access to a secured resource;
triggering execution of the particular application, from a closed or inactive state on the mobile device, in response to receiving, at the mobile device, a first beacon of the set of beacons from a beaconing device during a first time;
completing a first phase of the two-phase access procedure based on (i) said triggering execution and (ii) successfully authorizing access to the secured resource during the first phase;
resuming execution of the particular application in response to receiving, at the mobile device, a different second beacon of the set of beacons from the beaconing device;
completing a second phase of the two-phase access procedure based on (i) said resuming execution, (ii) said completion of the first phase, and (iii) the mobile device being a specified distance from the beaconing device; and
obtaining access to the secured resource in response to completing the first phase and the second phase of the two-phase access procedure.

2. The method of claim 1, wherein the particular application is in the closed or inactive state prior to said triggering execution.

3. The method of claim 1, wherein completing the first phase comprises exchanging a first set of messages, with which to authorize identity of the mobile device or user of the mobile device, with one or more of the beaconing device or an access control unit ("ACU"), wherein the beaconing device is positioned near the secured resource, and the ACU is positioned remote from the secured resource.

4. The method of claim 3, wherein completing the second phase comprises exchanging a second set of messages, with which to confirm intent to access the secured resource, with one or more of the beaconing device or the ACU.

5. The method of claim 4, wherein completing the first phase further comprises establishing a secure network connection through which the first set of messages are exchanged, and wherein completing the second phase further comprises reusing the secure network connection that is already established for said exchanging of the second set of messages.

6. The method of claim 1 further comprising commencing execution of the first phase in response to the mobile device coming within beaconing range of the beaconing device while remaining greater than the specified distance from the beaconing device, and commencing execution of the second phase in response to the mobile device coming within the specified distance from the beaconing device.

7. The method of claim 1, wherein the mobile device remains in a locked or standby state during said completing the first phase and said completing the second phase, wherein the mobile device exits the locked or standby state in response to user interaction with the mobile device.

8. The method of claim 1, wherein said completing the first phase and said completing the second phase occur without user interaction with the particular application.

9. The method of claim 1 further comprising receiving the first beacon and the second beacon at different times via Bluetooth Low Energy ("BLE"), Bluetooth, or Near Field Communications ("NFC").

10. The method of claim 1, wherein said resuming execution comprises restarting execution of the particular application from the closed or inactive state, or resetting a timer, that places the particular application in the closed or inactive state after a period of time.

11. The method of claim 10 further comprising starting the timer in response to said triggering execution of the particular application, and continuing the timer while continuing to receive the first beacon, wherein the mobile device closes the particular application or places the particular application in the inactive state upon the timer reaching an expiration time away from a start time.

12. The method of claim 11 further comprising resetting the timer to the start time in response to said resuming execution and receiving the second beacon, wherein the beaconing device is configured to broadcast a different beacon from the set of beacons in a time that is less than the time between the timer start time and the expiration time.

13. A mobile device comprising:
a wireless radio;
a non-transitory computer-readable medium storing a set of processor-executable instructions and a particular application; and
one or more processors configured to execute the set of processor-executable instructions, wherein executing the set of processor-executable instructions causes the one or more processors to:
receive, via the wireless radio, a first beacon while the mobile device is a first distance from a secured resource;
trigger execution of the particular application, from a closed or inactive state, in response to the first beacon being registered as part of a set of beacons that trigger execution of the particular application;

perform a first phase of a two-phase access procedure according to (i) the execution of the particular application, (ii) the first phase having not been previously completed, and (iii) the mobile device being a first distance that is greater than a closer second distance from the secured resource;

receive, via the wireless radio, a different second beacon after a period of time during which the mobile device is moved to the closer second distance from the secured resource;

resume execution of the particular application in response to the second beacon being registered as part of the set of beacons;

perform a second phase of the two-phase access procedure according to (i) the resumed execution of the particular application, (ii) completion of the first phase, and (iii) the mobile device being the closer second distance from the beaconing device; and obtain access to the secured resource in response to completing the first phase and the second phase of the two-phase access procedure.

14. The mobile device of claim 13, wherein the processor-executable instructions further include processor-executable instructions to establish a secure connection with a beaconing device, that transmits the first beacon and the second beacon, prior to said performing the first phase.

15. The mobile device of claim 14, wherein the processor-executable instructions further include processor-executable instructions to transmit a first set of messages over the secure connection during said performing of the first phase, and transmit a different second set of messages over the secure connection, without reestablishing the secure connection, during said performing of the second phase.

16. The mobile device of claim 13, wherein the processor-executable instructions further include processor-executable instructions to:

exchange a set of access authorization messages during said performing of the first phase, the first set of access authorization messages verifying that the mobile device or a user associated with the mobile device is permitted to access the secured resource; and exchange a request message based on previously authorized access privileges to the secured resource during said performing of the second phase.

17. The mobile device of claim 13, wherein the wireless radio is a first wireless radio, the mobile device further comprising a second wireless radio, and wherein the processor-executable instructions further include processor-executable instructions to detect, via the first wireless radio, beacons transmitted by a beaconing device over a first wireless network, and transmit messaging while performing the first phase and the second phase over a different second wireless network using the second wireless radio.

18. A system comprising:

a beaconing device comprising a wireless radio, the beaconing device transmitting a different beacon from a set of beacons at different times via the wireless radio;

a mobile device comprising:

a non-transitory computer-readable medium storing a set of processor-executable instructions and a particular application; and one or more processors configured to execute the set of processor-executable instructions, wherein executing the set of processor-executable instructions causes the one or more processors to:

trigger execution of the particular application in response to receiving a first beacon from the set of beacons, and the first beacon being registered to the particular application;

complete a first phase of a two-phase access procedure based on (i) said triggering execution and (ii) successfully authorizing access to a remotely operated secured resource during the first phase;

resume execution of the particular application in response to receiving a different second beacon from the set of beacons and the second beacon being registered to the particular application; and complete a second phase of the two-phase access procedure based on (i) said resuming execution, (ii) said completion of the first phase, and (iii) the mobile device being within a specified distance from the beaconing device; and the remotely operated secured resource granting access to the mobile device based on signaling provided in response to said completing the first phase and said completing the second phase, wherein the remotely operated secured resource is positioned near the beaconing device.

19. The system of claim 18 further comprising an access control unit ("ACU"), and wherein the processor-executable instructions further include processor-executable instructions to receive the first beacon and the second beacon from the beaconing device via a first wireless network, and to transmit messaging during the first phase and the second phase to the ACU via a different second wireless network.

20. The system of claim 18, wherein the beaconing device further comprises an internal clock that is synchronized with an internal clock of at least one other beaconing device, wherein the beaconing device and the at least one other beaconing device are synchronized to transmit a same beacon from the set of beacons based on the synchronized internal clock.

* * * * *